United States Patent
Lostrom et al.

(10) Patent No.: US 11,959,592 B2
(45) Date of Patent: Apr. 16, 2024

(54) SELF-ADJUSTING BAND

(71) Applicant: Naval Information Warfare Center Pacific, San Diego, CA (US)

(72) Inventors: Carl E Lostrom, San Diego, CA (US); Gregory A Jaccard, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 395 days.

(21) Appl. No.: 17/516,907

(22) Filed: Nov. 2, 2021

(65) Prior Publication Data
US 2023/0134588 A1    May 4, 2023

(51) Int. Cl.
  *F17C 13/00*    (2006.01)
(52) U.S. Cl.
  CPC ................................. *F17C 13/002* (2013.01)

(58) Field of Classification Search
  CPC ................................ F17C 13/002; F16B 2/08
  See application file for complete search history.

(56) References Cited

U.S. PATENT DOCUMENTS

| | | | | |
|---|---|---|---|---|
| 2,706,648 A | * | 4/1955 | Gosse | F16L 23/06 24/271 |
| 4,341,406 A | * | 7/1982 | Abbes | F16L 23/10 285/411 |
| 4,455,720 A | * | 6/1984 | Sutton | F16L 3/23 24/484 |
| 9,428,969 B2 | * | 8/2016 | Harbison | F16B 2/08 |

* cited by examiner

*Primary Examiner* — Anita M King
(74) *Attorney, Agent, or Firm* — Naval Information Warfare Center, Pacific; Kyle Eppele; Matthew D. Pangallo

(57) ABSTRACT

A self-adjusting band that includes one or more banding segments, one or more buckling assemblies, a pair of one pin and two links for each buckle assembly, a rotary joint base for each pair of one pin and two links, and a high-load, low-deflection compression spring for each section of the buckle assembly.

14 Claims, 5 Drawing Sheets

SELF-ADJUSTING BAND

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

A pressure housing is a tube that keeps the internal components dry and protects the internal components from a crushing force from external fluid. Pressure housings are used extensively in underwater systems. These systems include a stand-alone system or as a part of a system (e.g., ROV, UUV, undersea equipment) in housings that may be interconnected via cables. Due to external pressure and optimization, these vessels are often designed to be cylindrical in shape. External devices such as sensors, lights, cameras, brackets, or other hardware may need to be attached to the outside vessel wall. A band-type solution is used to attach the external devices, which wraps around the object and pressure vessel circumference. The band-type device is tensioned, which then applies force all around the pressure vessel and the external device in a radial direction. These bands are often tensioned by mechanical means such as bolts, screws, inherent locking, latching features, and integral springs to compensate for diameter changes of the clamped external devices.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Figure 1:
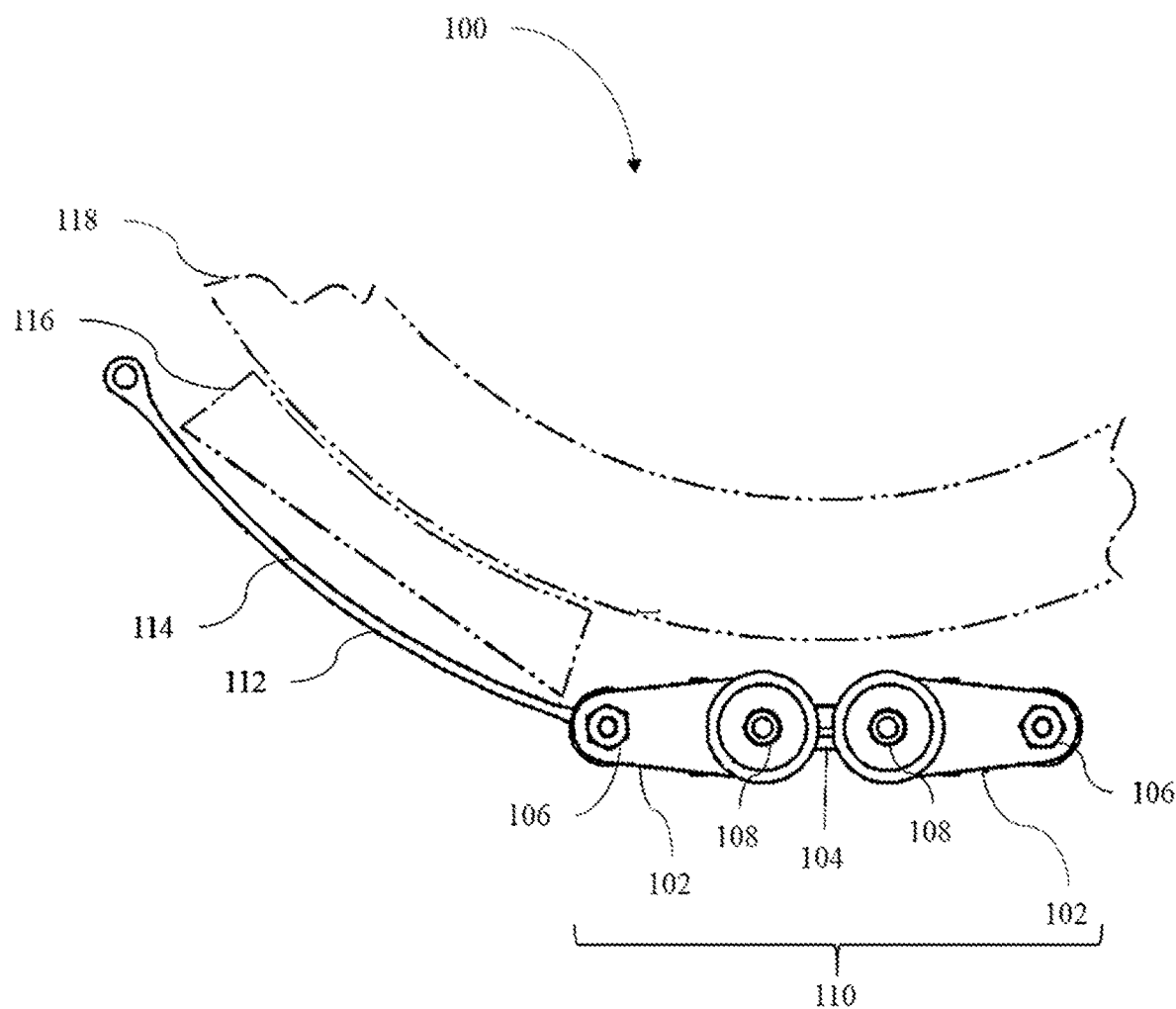
FIG. 1 is a plan view of an example of a self-adjusting band with one buckle assembly and one circumferential band segment.

Currently, there are two types of bands used to attach external devices to a pressure vessel: a static band and a spring-loaded band. The static band has a pre-load applied to the band by elastically stretching the band during the initial installation. Under hydrostatic loading, this pre-load will decrease as the pressure vessel decreases in diameter and the band will eventually return to its original un-stretched length. Therefore, the static band is only viable for very small changes in size. For example, the length of the band must change by over 6 times the change in the radius. For most metals, the material may be considered to be within the elastic region if the strain is within 0.2%. Therefore, this limits the range of contraction for a static band or the depth a static band may be used.

The spring-loaded band is another type of band currently being used where a compression spring or a compression element, such as a rubber strip, is used to preload the band. The spring is preloaded when the vessel is exposed to atmospheric pressure, and as the vessel is compressed by hydrostatic pressure, the spring loses pre-load and the banding decreases in effective total length. A spring-loaded band requires a large physical footprint external to the pressure vessel. The materials used for the spring are typically designed for terrestrial applications, which do not perform well in marine environments due to corrosion effects or galvanic corrosion with adjacent materials. When a compressible rubber strip is used in the spring-loaded band, many of the galvanic concerns are mitigated, but these bands have degradation issues of the rubber over time including ultraviolet damage and saltwater intrusion. This damage can cause the band to rupture or to become brittle over time, which would prevent the band from supplying the required tension to maintain the desired clamp load.

The self-adjusting band herein is designed to adjust the radial force exerted on the clamped external device or object based on design requirements taking into account changes resulting from the external environment. —Since the design of the band is self-adjusting, the band can be used in marine environments at a wide variety of depths, limited only by the specific disc spring configuration. Furthermore, the design does not limit the self-adjusting band to a particular material or materials. Therefore, the self-adjusting band herein can be prepared for a specific application to avoid corrosion, ultraviolet damage, or saltwater intrusion associated with other designs. Additionally, the self-adjusting band described herein can be utilized in space-constrained locations where bulky spring-loaded designs would not be feasible.

The self-adjusting band disclosed herein includes one or more banding segments, one or more buckling assemblies, a pair of one pin and two links for each buckle assembly, a rotary joint base for each pair of one pins and two links, and a high-load, low-deflection compression spring for each section of the buckle assembly.

Referring now to FIG. 1, a plan view of an example of the self-adjusting band 100 herein with a single buckle assembly 110. The dashed lines in FIG. 1 are for illustrative purposes only to aid in viewing and should not be construed as being limiting or directed to a particular material or materials. The self-adjusting band 100 shows one banding segment 112 where each banding segment contains two terminal ends with a securing mechanism at each terminal end. The single buckle assembly 110 is attached to a banding segment 112 that retains a clamped object 116 to a pressure vessel 118. The single buckle assembly 110 includes two pins (not shown in FIG. 1) and four links 102 (only two links 102 are shown in FIG. 1) where each pair of one pin and two links 102 attaches to the securing mechanism of each banding segment 112, thereby attaching one or more banding segments 112 to each other. In the example in FIG. 1, a single banding segment 112 with a single buckle assembly 110 can be used if the banding segment 112 is extended around the entire clamped object 116 and pressure vessel 118. Each pair two link 102 has a rotary joint base (not shown in FIG. 1) where each pair of the two links 102 attaches to the rotary joint base with a rotary joint retaining screw 108. The rotary joint bases include a gap between the rotary joint base of each pair of the one pin and two links 102 and an opening tangent to a band segment 112 where a pre-load screw (not shown in FIG. 1) is located and threaded into a coupling nut 104 that connects the rotary joint bases of each pair of one pins and two links 102.

Tension loads are transferred from the banding segment 112 through each pair of the two links 102 and the coupling nut 104. Each pair of the one pin and two links 102 allows the one or more banding segments 112 to pivot from the securing mechanism. The buckle assembly 110 is free to rotate about the axes constrained by the load segment pin retaining nut 106, and the rotary joint retaining screw 108 of each pair of the two links 102. The ability of the buckle assembly 110 to rotate allows overall shape changes to the system beyond circular shapes (as depicted in FIG. 1). The shape of the banding segment 112 may be changed in order to maintain a tangent load path around the complete loop of the clamp system.

The self-adjusting band 100 may encompass one or more objects 116 to the pressure vessel 118. Some examples of the objects include any object that that needs to stay attached to the pressure vessel 118 (e.g., fixtures), any object that needs to stay in a precise location on the pressure vessel 118, or any object that needs to be held in contact with the wall of the pressure vessel 118. Some specific examples include sensors (e.g., Hall Effect sensors, temperature sensors, etc.), transducers, lights, cameras, brackets, or other hardware. The pressure vessel 118 may be part of a stand-alone system or incorporated into a system, such as a remotely operated vehicle (ROV), unmanned underwater vehicle (UUV), or any other undersea equipment.

Figure 2:
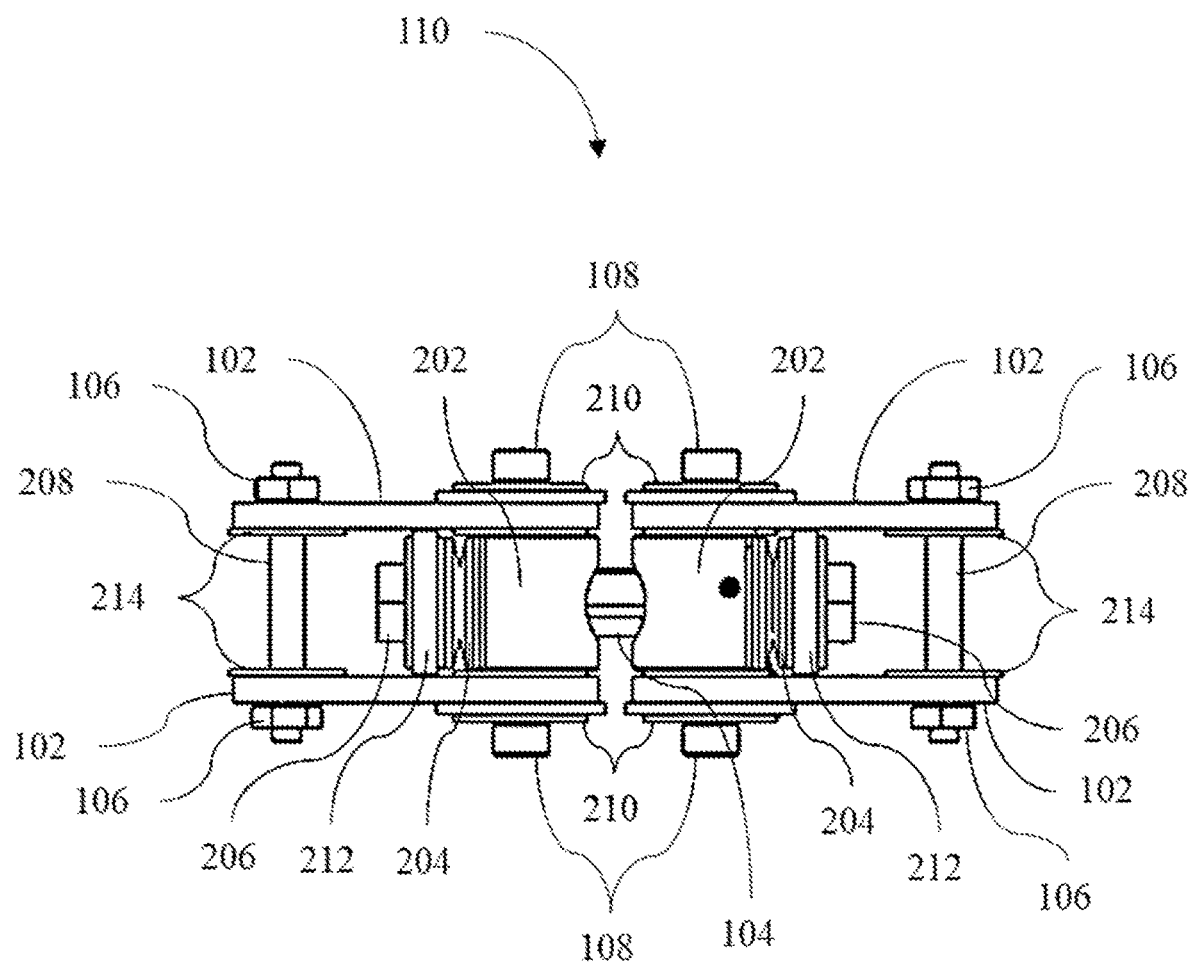
FIG. 2 is a side view of an example of a single buckle assembly in the self-adjusting band.

Referring now to FIG. 2, a side view of the single buckle assembly 110 is shown. The banding segments 112 are held in place with one pin 208 at each end of the buckle assembly 110. The load is carried along each pair of the two links 102 into the rotary joint base 202. As previously mentioned in FIG. 1, each buckle assembly 110 includes two pins 208 and four links 102 (i.e., a pair of one pin 208 and two links 102) that secure banding segments 112. In an example, the securing mechanism at each terminal end of the banding segment 112 may be a clearance hole at the terminal ends of each banding segment 112 where each pin 208 passes through the clearance hole and threads into a load segment pin retaining nut 106. The rotary joint base 202 also contains a horizontal clearance hole where the coupling nut 104 may slide. The coupling nut 104 is attached and preloaded through the preload screw 206 and a high-load, low-deflection compression spring 204. The high-load, low-deflection compression spring 204 is located between the rotary joint base 202 and the preload screw 206 of each pair of one pin 208 and two links 102. Some examples of the high-load, low-deflection compression spring 204 include a coil spring, a wave spring, a wave washer, a leaf spring washer, or a stack of Belleville-type spring washers. When the Belleville-type spring washers are used, the washers may be changed in orientation, size, material, and quantity in order to adjust the overall system clamp load and overall system self-adjustment range.

Throughout the self-adjusting band 100, along sliding surfaces and between dissimilar metals, bushings 212, 214 are used to prevent galvanic interactions and act as motion guides for the assembly. In some examples, the buckle assembly 110 has a pair of two links 102 that further includes a load bearing bushing 212 located between the preload screw 206 and the high-load, low-deflection compression spring 204. In other examples, the buckle assembly 110 includes including thrust bushings 214 located on an inner surface of each individual link 102 with the pin 208 passing through the thrust bushings 214. In the example shown in FIG. 2, each individual link 102 has two thrust bushings 214. Metallic washers 210 are also used to distribute clamp load from heads of the metallic fasteners to the bushings 212, 214 or bearings (shown in FIG. 3). In one example shown in FIG. 2, the metallic washers 210 are located between the rotary joint retaining screw 108 and the bearing (shown in FIG. 3). In another example not shown in FIG. 2, the metallic washers 210 are located between the inner surface of the each individual link 102 and the bushings 214. In yet another example not shown in FIG. 2, the metallic washers 210 between the preload screw 206 and the bushings 212. In yet another example not shown in FIG. 2, the metallic washers 210 may be located between the isolators (shown in FIG. 3) and the inner surface of each individual link 102.

Figure 3:
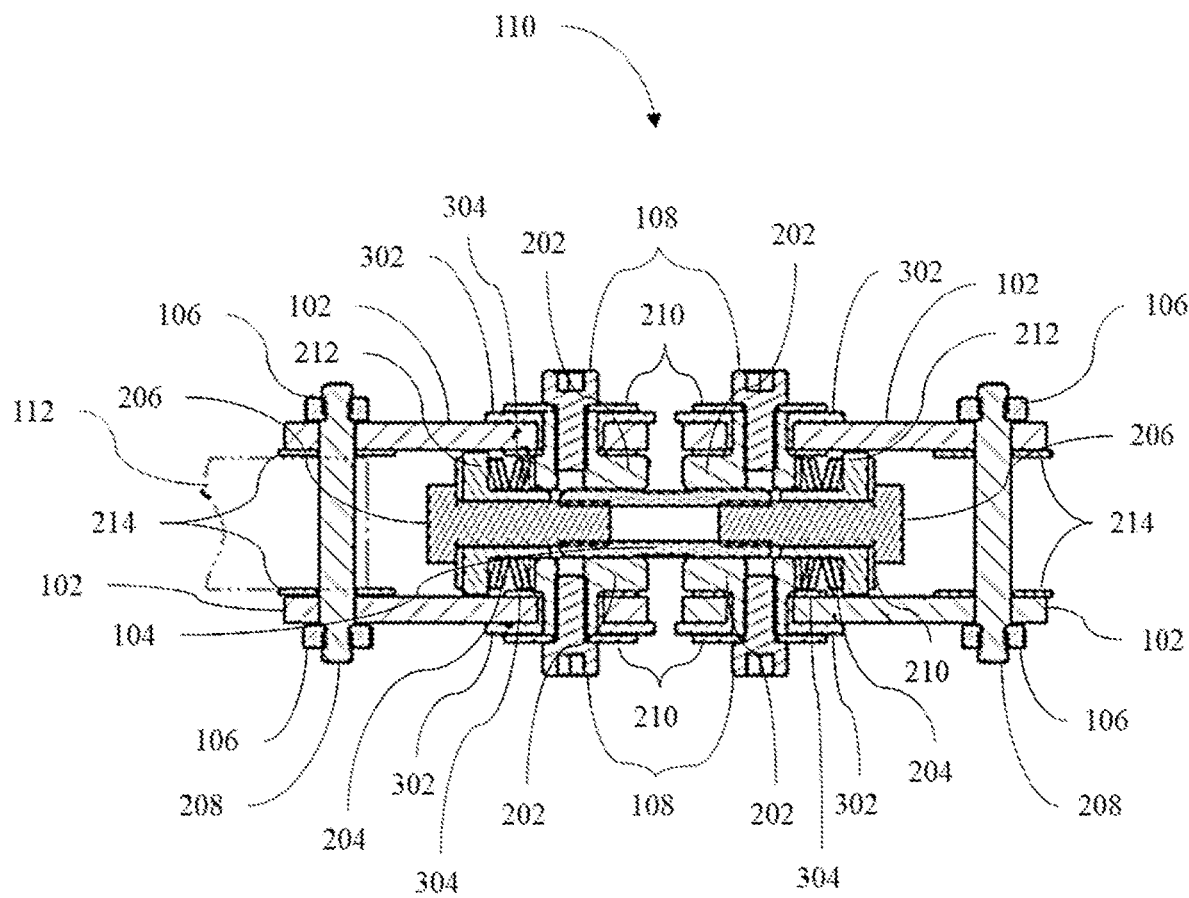
FIG. 3 is a cross-sectional side view of an example of a single buckle assembly in the self-adjusting band.

Referring now to FIG. 3, a cross-sectional view of the single buckle assembly 110 is shown. FIG. 3 is the same example shown in FIG. 2, but shows the internal orientation of the buckle assembly 110. The dashed and hatching lines in FIG. 3 are for illustrative purposes only to aid in viewing and should not be construed as being limiting or directed to a particular material or materials. In the example shown in FIG. 3, the buckle assembly 110 includes bearings 302 and isolators 304. The bearings 302 are located between the rotary joint retaining screw 108 and an outer surface of each individual link 102. The bearings 302 are used to allow free articulated movement of the self-adjusting band 100 as the self-adjusting band 100 is modified due to a changing clamp surface. The bearings 302 also prevent galvanic interactions. The isolators 304 are located between the inner surface of each individual link 102 and the high-load, low-deflection compression spring 204. In this configuration, the isolators 304 are used to provide a sliding surface and galvanic isolation from the washers 210 (e.g., Belleville-type washers), which allows the rotary joint base 202 to pivot and allows use of various marine-grade materials for the springs. As previously mentioned in FIG. 2, metallic washers 210 are used to distribute clamp load from heads of the metallic fasteners to isolators 304.

Figure 4:
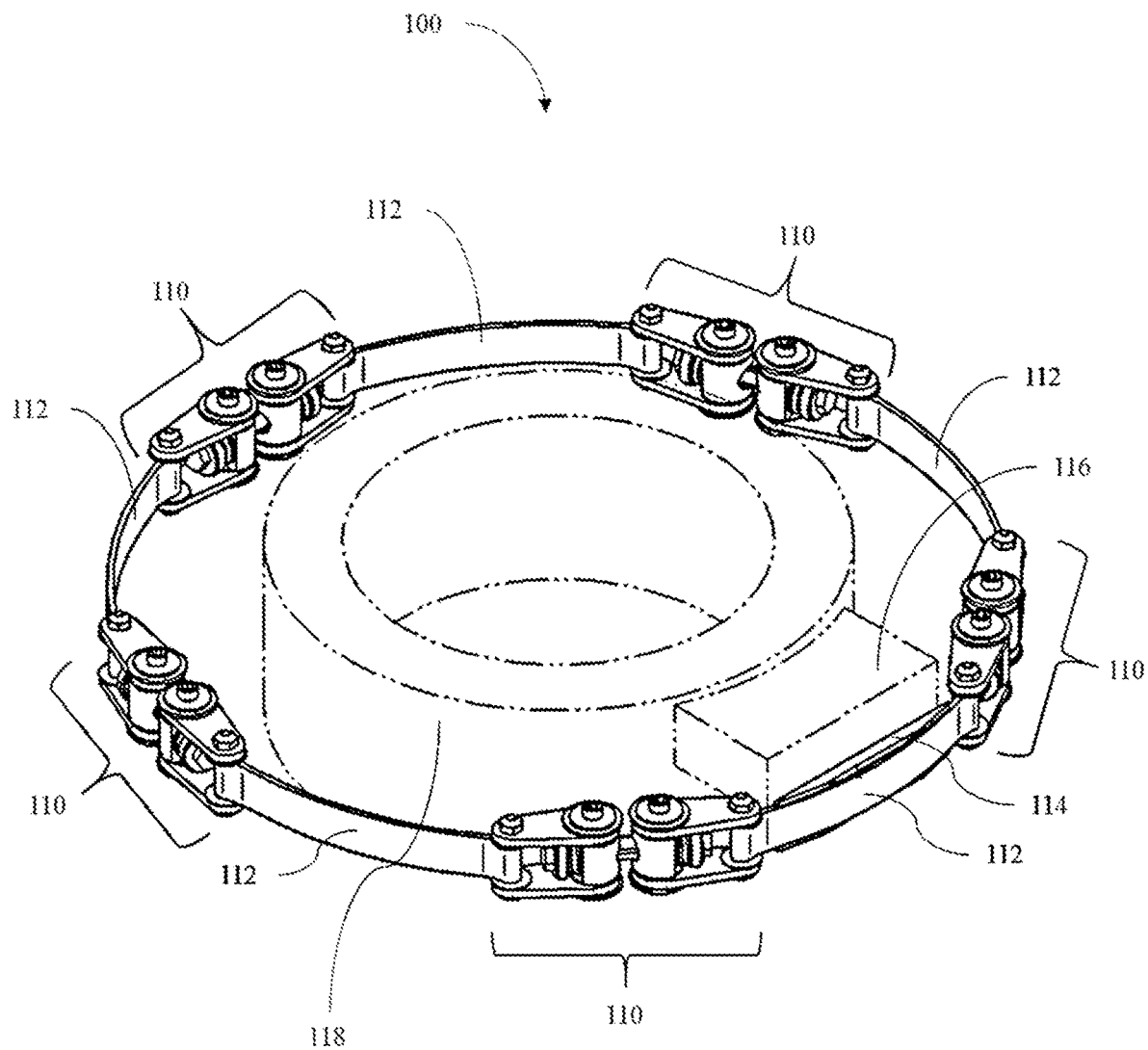
FIG. 4 is an isometric view of an example of a self-adjusting band that includes five linked banding segments and five buckle assemblies.

Referring now to FIG. 4, an isometric view of another example of the self-adjusting band 100 is shown. The dashed lines in FIG. 4 are for illustrative purposes only to aid in viewing and should not be construed as being limiting or directed to a particular material or materials. In this example, the self-adjusting band 100 has five buckle assemblies 110 and five banding segments 112. The buckle assemblies 110 and the banding segments 112 are the same buckle assemblies 110 and banding segments 112 as previously described herein. The self-adjusting band 100 encloses a pressure vessel 118 with a clamped object 116 secured to the pressure vessel 118. FIG. 4 also shows a radial interface adapter 114 that is located between the clamped object 116 and the banding segment 112 to conform to the shape of the banding. The radial interface adapter 114 conforms the one or more banding segments 112 to a surface of the object 116 and the pressure vessel 118. The radial interface adapter 114 may also provide a uniform surface for the banding to clamp to, even if the underlying objects being clamped is non-uniformly shaped.

Although the example in FIG. 4 shows the self-adjusting band 100 with five buckle assemblies 110 and five banding segments 112, the self-adjusting band 100 is not limited to a specific amount of buckle assemblies 110 and banding segments 112. There can be one buckle assembly 110 and banding segment 112 or as many as needed to encompass the pressure vessel 118 and the clamped object 116 or provide additional actuation range. In addition, in the example shown in FIG. 4, each buckle assembly 110 and banding segment 112 is identical, and the buckle assembly 110 is symmetric about the coupling nut. However, the self-adjusting band 100 may have different sizes or shapes of banding segments 112 or buckle assemblies 110 depending on the clamping requirements, clearances to external components, or a combination of both clamping requirements and clearances to external components. Furthermore, the buckle assembly 110 and banding segments 112 may be made with any known material that can adequately produce the self-adjusting band 100.

Figure 5:
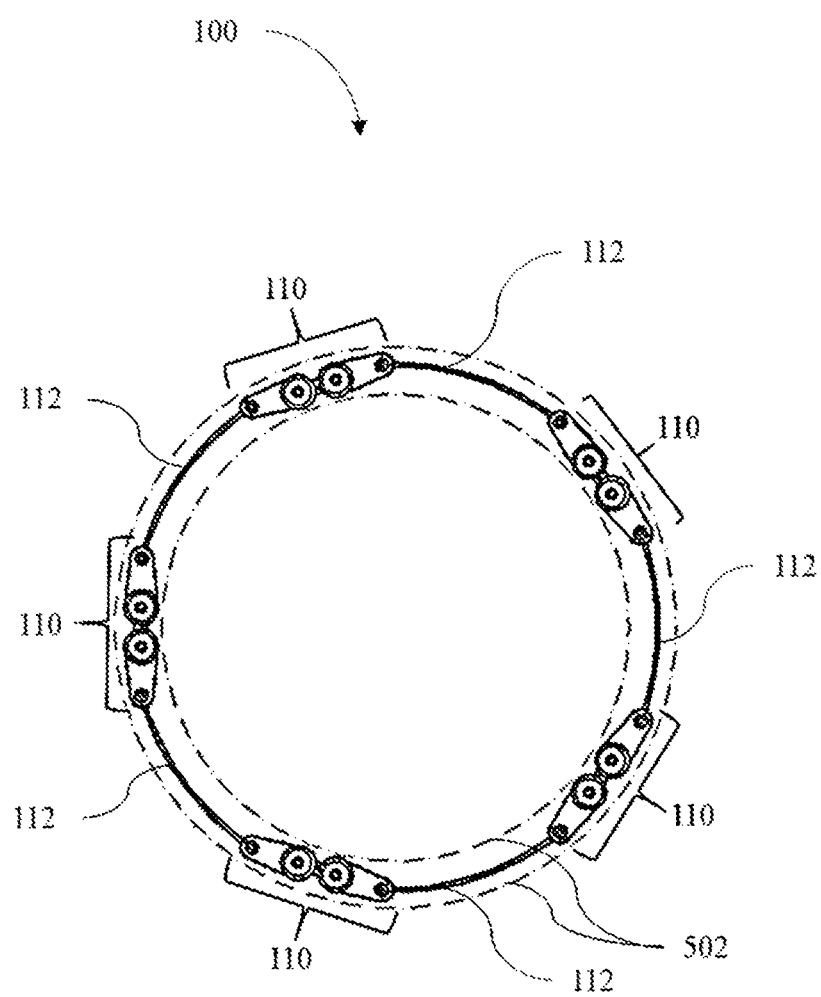
FIG. 5 is a plan view of another example of the self-adjusting band that includes an annular envelope.

Referring now to FIG. 5, a plan view of another example of the self-adjusting band 100 is shown. The dashed lines in FIG. 5 are for illustrative purposes only to aid in viewing and should not be construed as being limiting or directed to a particular material or materials. Similar to FIG. 4, in this example, the self-adjusting band 100 has five buckle assemblies 110 and five banding segments 112. The buckle assemblies 110 and the banding segments 112 are the same buckle assemblies 110 and banding segments 112 as previously described herein. In this example, the self-adjusting band 100 is shown within an annular operating envelope 502, which demonstrates the low-profile nature of the device, allowing it to operate in geometrically constrained environments.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

What is claimed is:

1. A self-adjusting band, comprising:
   one or more banding segments, wherein each banding segment contains two terminal ends with a securing mechanism at each terminal end;
   one or more buckle assemblies, wherein each buckle assembly includes a pair of one pin and two links where each pair of one pin and two links attaches to the securing mechanism of each banding segment, thereby attaching the one or more banding segments to each other;
   a rotary joint base for each pair of one pin and two links, wherein each pair of two links attaches to the rotary joint base with a rotary joint retaining screw and the rotary joint base includes a gap between the rotary joint base of each pair of one pin and two links and an opening tangent to the one or more band segments where a preload screw is located and the preload screw is threaded into a coupling nut that connects the rotary joint bases of each pair of one pin and two links; and
   a high-load, low-deflection compression spring for each pair of one pin and two links, wherein the high-load, low-deflection compression spring is located between the rotary joint base and preload screw.

2. The self-adjusting band of claim 1, wherein the one or more banding segments encompasses one or more objects.

3. The self-adjusting band of claim 2, wherein the one or more banding segments includes a radial interface adapter that conforms the one or more banding segments to a surface of the one or more objects.

4. The self-adjusting band of claim 1, wherein the link further includes a load bearing bushing located between the preload screw and the high-load, low-deflection compression spring.

5. The self-adjusting band of claim 1, wherein the securing mechanism is a clearance hole at the terminal ends of each banding segment where each individual pin passes through the clearance hole and threads into a load segment pin retaining nut.

6. The self-adjusting band of claim 1, wherein high-load, low-deflection compression spring is selected from the group consisting of a coil spring, a wave spring, a wave washer, a leaf spring washer, or a stack of Belleville-type spring washers.

7. The self-adjusting band of claim 1, further including bearings located between the rotary joint retaining screw and an outer surface of each individual link.

8. The self-adjusting band of claim 7, further including metallic washers located between the rotary joint retaining screw and the bearing, between an inner surface of each individual link and a bushing, between the preload screw and the bushing, between an isolator and the inner surface of each individual link, or a combination thereof.

9. The self-adjusting band of claim 1, further including a bushing located between the high-load, low-deflection compression spring and the preload screw.

10. The self-adjusting band of claim 1, further including a thrust bushing located on an inner surface of each individual the link with each individual pin passing through the thrust bushing.

11. The self-adjusting band of claim 1, further including isolators located between the inner surface of each individual link and the high-load, low-deflection compression spring.

12. The self-adjusting band of claim 1, wherein there are five buckle assemblies and five banding segments.

13. The self-adjusting band of claim 1, wherein more than one buckle assembly and banding segment is used and the more than one buckle assembly and banding segment are identical and the more than one buckle assembly is symmetric about the coupling nut.

14. The self-adjusting band of claim 1, wherein more than one buckle assembly and banding segment is used and the more than one buckle assembly and banding segment are different sizes and shapes.

* * * * *